July 28, 1925.
H. B. LAWSON
1,547,503
LID TAKE-OFF FOR GLASS FORMING MACHINES
Filed Sept. 13, 1924
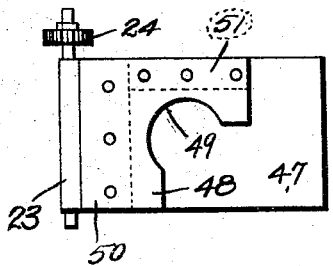
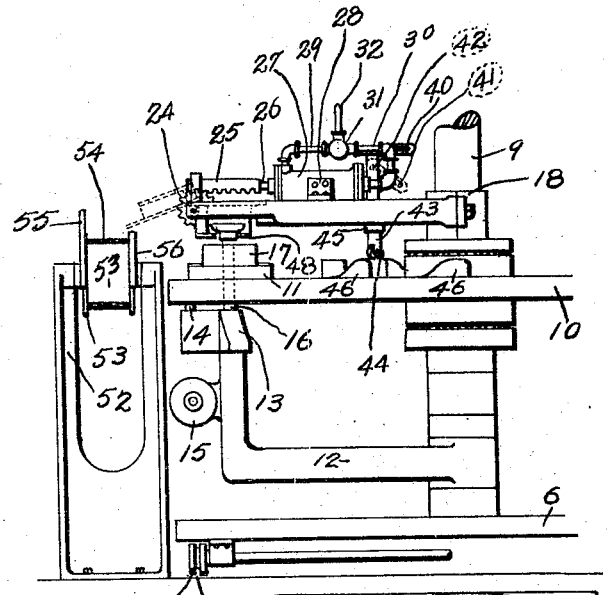
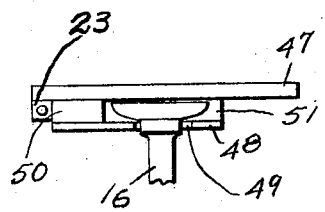
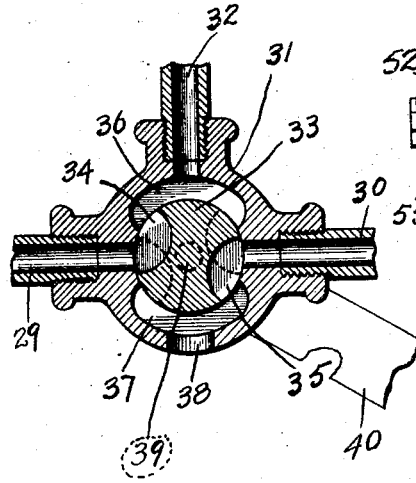
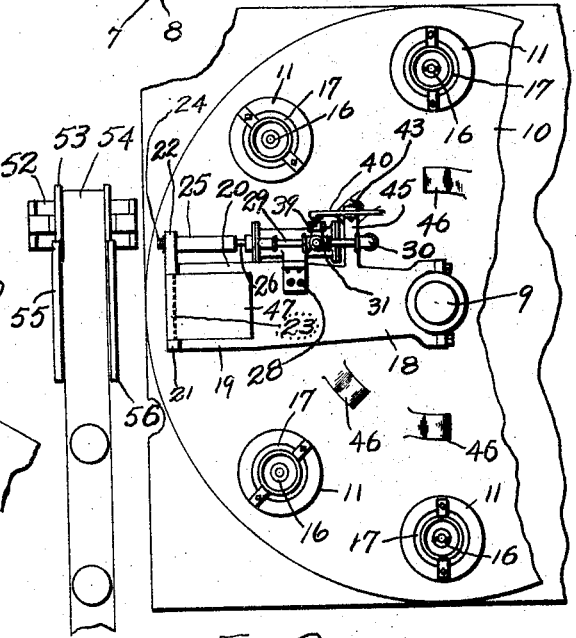
INVENTOR
HARRY B. LAWSON
By Edward C. Logan
ATTY.

Patented July 28, 1925.

1,547,503

UNITED STATES PATENT OFFICE.

HARRY B. LAWSON, OF HUNTINGTON, WEST VIRGINIA, ASSIGNOR TO SCHRAM GLASS MANUFACTURING CO., OF ST. LOUIS, MISSOURI, A CORPORATION OF MISSOURI.

LID TAKE-OFF FOR GLASS-FORMING MACHINES.

Application filed September 13, 1924. Serial No. 737,451.

*To all whom it may concern:*

Be it known that I, HARRY B. LAWSON, a citizen of the United States, and resident of the city of Huntington, county of Cabell, and State of West Virginia, have invented certain new and useful Improvements in Lid Take-Offs for Glass-Forming Machines, of which the following is a specification containing a full, clear, and exact description, reference being had to the accompanying drawings, forming a part thereof.

My invention relates to improvements in lid take-offs for glass forming machines, and has for its primary object a device which will automatically remove glass fruit jar lids or similar articles from the mold table of a glass forming machine and place them on a conveyor for delivery either to or adjacent the annealing furnace or leer.

A further object is to construct an automatic take-off for glass forming machines which is synchronized with the movement of the mold table and which will remove the ware when finished, place it on a belt conveyor and deliver it either to or adjacent the leer, thereby permitting one skilled glass-worker to take care of several machines simultaneously instead of taking care of only one machine as at present.

A still further object is to construct a means whereby glassware is automatically removed from the mold table of a glass forming machine, placed in such a position on a conveyor as to render it practically immune to tipping and deliver either directly to the leer or annealing furnace and in close proximity thereto wherein a considerable amount of time, now used in carrying the finished article to the annealing furnace and placing them therein, is done away with.

In the drawings:—

Fig. 1 is a fragmental side view of a mold table with my device in position;

Fig. 2 is a top plan view of the same;

Fig. 3 is an enlarged bottom plan view of the take-off device;

Fig. 4 is an enlarged edge view of the same showing a fruit jar lid in position ready to be removed; and Fig. 5 is an enlarged vertical section of the valve employed for controlling the operation of the take-off.

In the construction of my device I employ a carriage 6 which is supported on rollers 7; these rollers are preferably grooved and are designed to ride on tracks 8. Secured to the carriage 6 is a standard 9, on which is rotatably supported a mold table 10; this table has secured thereto a plurality of mold supports 11. Pivotally mounted on the standard 9 is an arm 12 which is provided with an inclined face 13 and with a dog 14. The arm 12 is designed to be swung through a fraction of a rotation by means of an air cylinder 15. This air cylinder, as well as the plunger, are synchronized in any well known manner and the movement is common to commercial glass forming machines now on the market and therefore will not be described in detail.

The inclined face 13 of the arm 12 is designed to come in contact with a plunger 16 for elevating the finished article out of the molds 17 which are secured to the mold supports 11. All of this portion of the device thus far described is in common use today and forms no actual part in my invention, it is merely described to bring out the peculiar functions of my device which will be hereinafter described.

Secured to the standard 9 is an arm 18, its outer end being bifurcated and forming extensions 19 and 20. The arm or extension 19 has formed integral therewith a bearing 21, while the arm 20 has a bearing 22, in which bearings are pivoted the ends of a rod 23. The end of the rod 23 which passes through the bearing 22 has secured thereon a gear 24 which meshes with a rack 25. The rack 25 is carried by the end of a piston rod 26; the piston rod 26 is provided with a piston head which is located within a cylinder 27. The cylinder 27 is secured to the arm 18 by means of a bracket 28 or other suitable fastening means. Secured to the cylinder 27 are air pipes 29 and 30 which preferably terminate in a valve 31. To this valve is also attached a pipe 32 which leads to any suitable source of compressed air supply. The valve 31 is provided with a rotating member 33 which has cut away portions 34 and 35. The valve 31 is also provided with an air chamber 36 and an exhaust chamber 37, the exhaust chamber having an outlet 38.

The rotating member 33 is provided with a valve stem 39 to which is secured a lever 40. The lever 40 is slotted as at 41 and through this slot is passed a pin 42 carried by the plunger 43, the lower end of which is provided with a roller 44.

The plunger is supported in a bearing 45 which is formed integral with the arm 18. Carried by the mold table are a plurality of cams 46 which correspond in number to the number of molds carried by the table.

Secured to the bar or rod 23 is a plate 47 which has secured to its undersurface a plate 48; the plate 48 is provided with a curved edge 49 which forms part of a circle and extends or covers slightly more than half of a complete circle. The plate 48 is spaced apart from the plate 47 by means of spacers 50 and 51, thus forming a pocket. This spacing is slightly greater than the height of the article to be removed (see Fig. 4). Adjacent the table 10 is mounted a support 52 which carries a flanged pulley 53 and around this pulley is mounted a belt conveyor 54; the opposite end of this conveyor terminates either at or adjacent the leer, as found desirable.

The gear wheel 24 is rigidly secured to the bar 23, as is the plate 47, so that when the gear is rotated the plate will swing into the position indicated by dotted lines in Fig. 1. It will be noted from this figure that the plate 47 is inclined sufficiently to allow the lid or glass article removed from the mold table to slide therefrom and on to the belt 54, and adjacent the point of delivery I provide retaining strips 55 and 56 which are located on either side of the belt and which positively locate the articles thereon.

The operation of my device is as follows:—

After the machine has been placed in operative position, the compressed air supply is turned on; this compressed air supply, by an automatically operated valve well known in the art, moves the mold table and the forming plunger synchronously, that is, brings the mold from the charging position to a point beneath the plunger and then stops, while the plunger descends to form the article. The plunger then raises and the second charged mold is brought beneath the plunger. This step by step movement however, is well known in the art, having been commercially used for a number of years therefore will not be described in detail.

This step by step movement of the mold table is accomplished by the arm 12 being swung into the arc of a circle by means of the air cylinder 15 and the pin or dog 14 and in so doing it raises the plunger 16 above the top of the mold 17. The upper end of the plunger forms a part of the mold 17 and thus raises the finished article. As the table is revolved the article is raised in the following manner: The arm 12 moves forward to permit the dog 14 to grasp the table for the next movement, brings the inclined surface 13 into contact with the bottom or lower end of the plunger 16 thus raising the end, lifting the finished article up and out of the mold. The dog 14 engages with the underside of the table 10 in any well known manner, preferably by means of depressions, and commences to move backward, during this period supporting the finished article above the mold. When in this position it is carried above the plates 48 and below the plate 47 into the space or pocket formed between these two plates. As soon as the table comes at rest, the roller 44 has ridden upward on the cam 46 and thus raises the lever 40 bringing the rotary member of the valve 41 into the position indicated by dotted lines in Fig. 5. This permits the compressed air to pass from the pipe 32 into the air chamber 36, into the pipe 30 and to the rear of the piston carried by the piston rod 26 driving the rack 25 forward. This rack in turn communicating movement to the gear wheel 24, which being rigidly attached to the rod 23, swings the plate into the position indicated by dotted lines in Fig. 1 and allows the finished articles to slide off on to the belt conveyor. At a predetermined time sufficient to permit a fresh mold to be charged the arm 12 again moves forward. This forward movement brings the arm out of contact with the plunger or pin 16 which has just raised and permits it to drop and at the same time elevates the next finished article above the mold, and commences to turn the table. As soon as the roller has left the cam 46 on which it has ridden, which is immediately after the table commences to move, the rotary member 33 of the valve 31 assumes the position indicated in solid lines in Fig. 5, thus permitting the compressed air to pass from the chamber 36 through the pipe 29 and draw the rack 25 backward, placing the device in position to receive the next finished article and at the same time, the pocket 35 permits the air on the opposite side of the piston to be forced from the cylinder and out through the exhaust outlet 38.

It is my intention to raise the finished articles from the upper end of the plunger 16 as soon as the table has become stationary and in this way remove any possibility of the plunger striking the plate 48 and at the same time return the plate to loading position before the finished article has arrived at a point where it would interfere with the return of the plate.

While I have shown one form of mechanism for operating the plate 47 so as to remove the articles at the proper time synchronously with the movement of the mold table, I do not wish to limit myself to this precise construction as there are many other ways in which this synchronizing and operation of the removing means can be obtained without departing from the spirit of my invention and which could possibly be constructed more cheaply than the means shown, the important feature being to have the removing device in position to take the article off the plunger 16 before the arm 12 swings back to rotate the table another step because this movement simultaneously lowers the plunger 16, and should it happen that the plate 47 was not in its charging position before this lowering of the plunger, it would be impossible to pick up the article.

It will be noted that when the lid is taken off and delivered to the conveyor it is inverted or turned over so that the lid rests with the sealing face down while passing through the leer so that there will be absolutely no distortion of the sealing face during the anealing of the lead.

Having fully described my invention, what I claim is:—

1. A lid take-off for glass forming machines comprising in combination with a glass forming machine having a rotary table provided with a plurality of molds, the means for lifting the finished article of said molds, of a plate pivotally mounted above the path of travel of said molds, a pocket formed on the underneath surface of said plate for receiving the finished article when raised out of the mold, and means for turning said plate with the finished article as lodged in the pocket and discharging the same on to a conveyor.

2. A lid take-off for glass forming machines comprising the combination with a glass forming machine having a mold table provided with a plurality of molds, means for raising the finished article out of the molds, and means for rotating said table step by step, of an arm provided with a bifurcated end extending above said mold, a rod pivotally mounted in said bifurcation, means operated synchronously with the mold table for rotating said rod, a plate secured to said rod and movable therewith, and means carried by said plate for engaging with a finished article for moving the same from its position above the mold table and discharging the same on to a conveyor.

3. A lid take-off for glass forming machines comprising the combination with a glass forming machine having a rotary mold table, a conveyor located adjacent the table, of means located above the mold table and adapted to engage with a finished article and support it on its underneath surface, and means for imparting movement to said article engaging means, whereby the article is moved from the mold table and deposited on the conveyor belt.

4. In a lid take-off for glass forming machines the combination with a rotary forming machine provided with plungers for elevating the formed article out of the mold, a plate provided with a pocket arranged in the path of travel of the formed article when elevated, an air cylinder synchronized with the movement of the mold table, and a rack and pinion connected to said plate and said cylinder.

5. In an apparatus of the class described the combination with a rotary mold table provided with plungers for elevating the formed articles out of the molds, a plate provided with a pocket arranged in the path of travel of the article when elevated from the molds, a cylinder synchronized with the movement of the mold table and a connection between the said cylinder and said plate for reversing the same.

6. A take-off comprising in combination with a glass forming machine having a rotary mold table and means for elevating the finished article out of the molds carried thereby, of a plate pivotally mounted above said table, means carried by said plate and adapted to engage with the elevated article, and means synchronized with the movement of the mold table for imparting movement to said pivoted plate whereby said finished article is removed from the elevating means and deposited in inverted position adjacent the mold table.

7. A lid take-off for glass forming machines, comprising a plate, a pocket formed on said plate and adapted to receive a finished article from a glass forming machine, a conveyor, and means for moving said plate for discharging the finished article from said pocket onto said conveyor.

8. A lid take-off for glass forming machines comprising a pivotally mounted plate adapted to be located above the molds of a glass forming machine, means carried by said plate and adapted to receive a finished article from said molds and support the same, and means synchronized with the movement of said molds for imparting movement to said plate whereby said article is deposited in an inverted position adjacent the forming machine.

9. A take-off for glass forming machines comprising a support, a plate pivotally carried by said support and adapted to be located above the line of travel of the molds of a glass forming machine, a pocket formed on said plate for receiving and supporting a finished article, and means for operating said plate synchronously with the movement of the mold table of a glass forming machine for inverting and delivering said finished article adjacent the mold table.

10. A take-off for glass forming machines comprising an arm provided with a bifurcated end, a rod pivotally mounted in said bifurcation, a plate secured to said rod and movable therewith, said plate adapted to be located above the path of travel of the molds of a rotary glass forming machine, means carried by said plate for engaging with and supporting a finished article on its underneath surface, and means operated synchronously with the mold table for rotating said rod whereby the finished article is moved from its position above the mold table and delivered in inverted position adjacent said table.

In testimony whereof I have signed my name to this specification.

HARRY B. LAWSON.